United States Patent
Bolle et al.

(10) Patent No.: US 6,819,219 B1
(45) Date of Patent: Nov. 16, 2004

(54) METHOD FOR BIOMETRIC-BASED AUTHENTICATION IN WIRELESS COMMUNICATION FOR ACCESS CONTROL

(75) Inventors: Rudolf Maarten Bolle, Bedford Hills, NY (US); Sharon Louise Nunes, Hopewell Junction, NY (US); Sharathchandra Pankanti, Mount Kisco, NY (US); Nalini Kanta Ratha, White Plains, NY (US); Barton Allen Smith, Campbell, CA (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 09/689,598

(22) Filed: Oct. 13, 2000

(51) Int. Cl.[7] .................. G05B 19/00; G06F 7/00; G08B 29/00; H04B 1/00; H04L 9/00
(52) U.S. Cl. .............. 340/5.52; 340/5.82; 713/186
(58) Field of Search ................ 340/5.52, 5.53, 340/5.54, 5.63, 5.82, 5.83–5.86; 713/186, 202; 307/10.5, 10.2

(56) References Cited

U.S. PATENT DOCUMENTS

| | | | | |
|---|---|---|---|---|
| 4,993,068 A | * | 2/1991 | Piosenka et al. ............ 713/186 |
| 5,259,025 A | * | 11/1993 | Monroe et al. ............. 705/75 |
| 5,457,747 A | * | 10/1995 | Drexler et al. ............. 713/186 |
| 5,541,585 A | * | 7/1996 | Duhame et al. ............ 340/5.62 |
| 5,686,765 A | * | 11/1997 | Washington ................ 307/10.5 |
| 5,719,950 A | * | 2/1998 | Osten et al. ................ 382/115 |
| 5,812,067 A | * | 9/1998 | Bergholz et al. ........... 340/5.52 |
| 5,831,533 A | * | 11/1998 | Kanno ........................ 340/5.64 |
| 5,878,142 A | * | 3/1999 | Caputo et al. .............. 713/159 |
| 5,917,913 A | * | 6/1999 | Wang ........................... 705/67 |
| 5,995,014 A | * | 11/1999 | DiMaria ..................... 340/5.52 |
| 6,041,410 A | | 3/2000 | Hsu et al. ..................... 713/186 |
| 6,081,893 A | | 6/2000 | Grawrock et al. ........... 713/183 |
| 6,182,221 B1 | * | 1/2001 | Hsu et al. ..................... 713/186 |
| 6,376,930 B1 | * | 4/2002 | Nagao et al. ............... 307/10.2 |
| 6,377,699 B1 | * | 4/2002 | Musgrave et al. .......... 382/117 |
| 6,507,662 B1 | * | 1/2003 | Brooks ....................... 382/115 |
| 6,532,298 B1 | * | 3/2003 | Cambier et al. ............ 382/117 |

\* cited by examiner

*Primary Examiner*—Michael Horabik
*Assistant Examiner*—Nam Nguyen
(74) *Attorney, Agent, or Firm*—Lacasse & Associates, LLC; Randy W. Lacasse; Ramraj Soundararajan

(57) ABSTRACT

Smart cards systems that are utilized in biometric authentication are slow in processing and have the cards themselves have the added disadvantage of being misplaced or lost. Moreover, storing biometric data (on a database) over a network poses security issues that in extreme instances can be compromised. Significant security can be achieved if the biometric templates are stored locally in a portable device. A user can use the portable device to either transmit wirelessly the stored biometric for authentication purposes, or a user can locally measure a biometric using the portable device and match it against a biometric which is also stored locally (in the portable device).

29 Claims, 11 Drawing Sheets

METHOD FOR BIOMETRIC-BASED AUTHENTICATION IN WIRELESS COMMUNICATION FOR ACCESS CONTROL

BACKGROUND OF THE INVENTION

1. Field of Invention

The present invention relates generally to the field of biometric-based authentication. More specifically, the present invention is related to biometric-based authentication in wireless communications for access control.

2. Discussion of Prior Art

In an age where electronic transactions are prevalent, safe-guarding data has become an important issue, thus giving rise to a myriad of security systems. Two of the common security systems used are password and personal identification (PIN) systems. Password systems require a user to provide the authentication system with a username and a password (both of which are unique to the user.) PIN systems on the other hand usually require a user to provide a code, usually referred to as the PIN code, for authentication purposes. Both the password and the PIN system can prove to be a nuisance to users in the event they forget their password or PIN code. Moreover, a user A can easily impersonate another user B if user A happens to get a hold of the password or PIN code (given either voluntarily or cracked through other means) of user B. One way to avoid such breaches of security is to implement a user-based physiological or behavioral characteristics as a means for authentication. This is the general idea behind biometrics.

Biometrics is the study of measurable biological characteristics. In computer security, biometrics refers to authentication techniques that rely on measurable physiological or behavioral characteristics that can be automatically checked.

In the above description, authentication is usually accomplished via a biometric device. A general description of the functionality of a biometric device now follows. First, the biometric device captures a profile of the characteristic and next, a comparison of the acquired profile is made with a stored profile or template. Lastly, upon successful matching of the captured and stored profile, the user is interfaced with the application system requesting authentication.

Biometrics, as described above and in FIG. 1, depend on physiological 104 or behavioral 106 characteristics of a person. Physiological characteristic 104 is a stable physical characteristic associated with a person. In other words, it is a set of physical characteristics (of a person) that does not change, in any considerable way, with respect to time. Some examples of physiological characteristics 104 that are stable and which can be utilized for authentication purposes include, but are not limited to: fingerprint pattern 108, retinal pattern 110, iris pattern 112, facial pattern 114, hand silhouette pattern 116, or blood vessel pattern on the back of the eye.

On the other hand, a behavioral characteristic 106 involves a person's psychological makeup in conjunction with various other general physical traits such as sex and size. Examples of behavioral characteristics 106 that can be monitored include, but are not limited to: signature pattern 118, voice pattern 120, or typing pattern or keystroke dynamics 122. A general description of some of the physiological and behavioral characteristics are outlined below.

Authentication based on fingerprint: One of the most common biometric techniques, wherein users scan in a copy of their fingerprint and a comparison is performed by the authentication device as to whether or not the input fingerprint matches that of a stored fingerprint, corresponding to the same person. Some fingerprint authentication devices take it a step further and check for a pulse to combat problems posed by false-authentication via fingerprints that are not real.

Authentication based on hand geometry: An authentication querying system captures the physical characteristics of a user's hand and fingers via a scanner and is matched with a stored template of the same user. Upon successful authentication, an action (like opening a secure door) is performed by the querying system.

Authentication based on retinal scanning: A scanner scans at close range a user's retina (the image forming innermost coat of the black part of the eye ball) using a low intensity light, creates a eye signature, matches it with a stored retinal template, and performs a specific action upon successful authentication. It should however be noted that failure of a user to focus correctly results in inaccurate results.

Authentication based on iris scanning: An iris scanner scans unique random patterns of the iris (the colored part of the eye) and authenticates users based on comparing the consistency of the acquired pattern with that of stored patterns. Unlike retinal scanning, close range interaction is not required.

Authentication based on facial recognition: A facial recognition system scans (the features of a users face) and captures an image of the user's face and compares it to a stored static facial image of the same user. Upon successful authentication, a specific action is performed by the facial recognition system.

Authentication based on signature verification: This authentication technique utilizes a pressure sensitive pen and a tablet to record a user's signature. The system then compares it against stored samples of signatures corresponding to the same user, and upon authentication, performs a specific action.

Authentication based on voice recognition: Authentication in this technique is based on recognizing voice and speech characteristics (associated with a user) that are imperceptible and hence not replicable. Voice recognition systems typically require more memory for storing voice templates of users.

Hence, biometrics are beginning to play a critical role in authentication and security. Biometrics authenticate the user not based on what he can remember (like passwords, PIN's, etc.), but rather use the user's characteristics (or who the user is) to perform authentication.

FIG. 2 illustrates prior art biometric authentication system 200. A combination of two authentication scenarios are illustrated in this example. In the first scenario user 201 uses smart card 202, and in the second scenario, a scan for an biometric attribute is performed 208, on user 201, for further authentication. In the first scenario, user 201 inserts smart card 202 into smart card reader system 204. Then, the smart card reader system 204 extracts biometric profile 206 (stored in smart card 202) that is unique for user 201. Next, the extracted profile 206 is compared with profiles stored in database 212 to determine if a match exists. Furthermore, in the second scenario, a scan for attribute 208 (e.g., a retinal scan) is performed on user 201 and the system creates digital profile 210 of the measured attribute. Next, the measured digital profile is compared with digital profiles stored in database 212 to determine if a match exists, and upon successful matching, an action is performed (like opening a secure door).

The prior art scenario described above exposes some of the pitfalls associated with these authentication systems. A biometric template or profile associated with a user, as described in the above example, is either stored on smart card (first scenario) 202, which must be inserted into reader or scanner 204, or on server (second scenario) 212. One common problem associated with the first scenario is that smart card reader 204 in the authentication system processes information in a very slow and time consuming manner. Each time a card is removed from the user and placed in a reader, increases the chance that the card will be left in the reader or otherwise lost. The exposed contacts of smart cards and readers make them susceptible to dirt, grime and other contaminants, decreasing reliability. This is particularly an issue for outdoor verification, for example at automatic teller machines which are exposed to weather and vandalism.

One common concern associated with the second scenario is that storing the biometric profile in database 212 and accessing it over a network is not completely secure. In other words, the biometric data stored in databases accessible over a network is susceptible to attacks from intruders.

Thus, the prior art systems described above fail to provide a fast and secure way of accessing biometric profiles, and moreover none of the above mentioned systems provide for a system and a method for authenticating users in a wireless manner. Whatever the precise merits, features and advantages of the above cited references, none of them achieve or fulfills the purposes of the present invention. The current invention provides for a system and a method for wirelessly authenticating a user using acquired biometrics (e.g., fingerprint) and a locally stored biometric template. These and other objects are achieved by the detailed description that follows.

SUMMARY OF THE INVENTION

The present invention provides for a method and a system to wirelessly authenticate a user using a combination of biometrics (e.g., fingerprint) and a locally stored biometric template. By storing the biometric template locally, the current system reduces the chances an intruder can access biometric data.

A portable device is provided that can locally store a biometric template that can be used for authentication purposes. When a challenge is presented to the portable device, it can either wirelessly transmit the biometric template to the system presenting the challenge, or optionally it can measure the biometric, match the measured biometric with the stored biometric template and respond accordingly to the querying system. For example, the portable device could either transmit to a querying system a fingerprint template associated with the user, or optionally the portable device measures the fingerprint pattern of the user and matches it with the locally stored fingerprint template. Upon successful matching, the portable system sends an authentication message to the querying system.

In one embodiment, once a user is reliably authenticated by a portable device, the authentication status is temporarily maintained to perform various privileged activities based on renewing authentication status using various criterion or thresholds. But, once an unfamiliar pattern associated with the user is detected, a solid biometric authentication is required.

DESCRIPTION OF THE PREFERRED EMBODIMENTS

Figure 1:
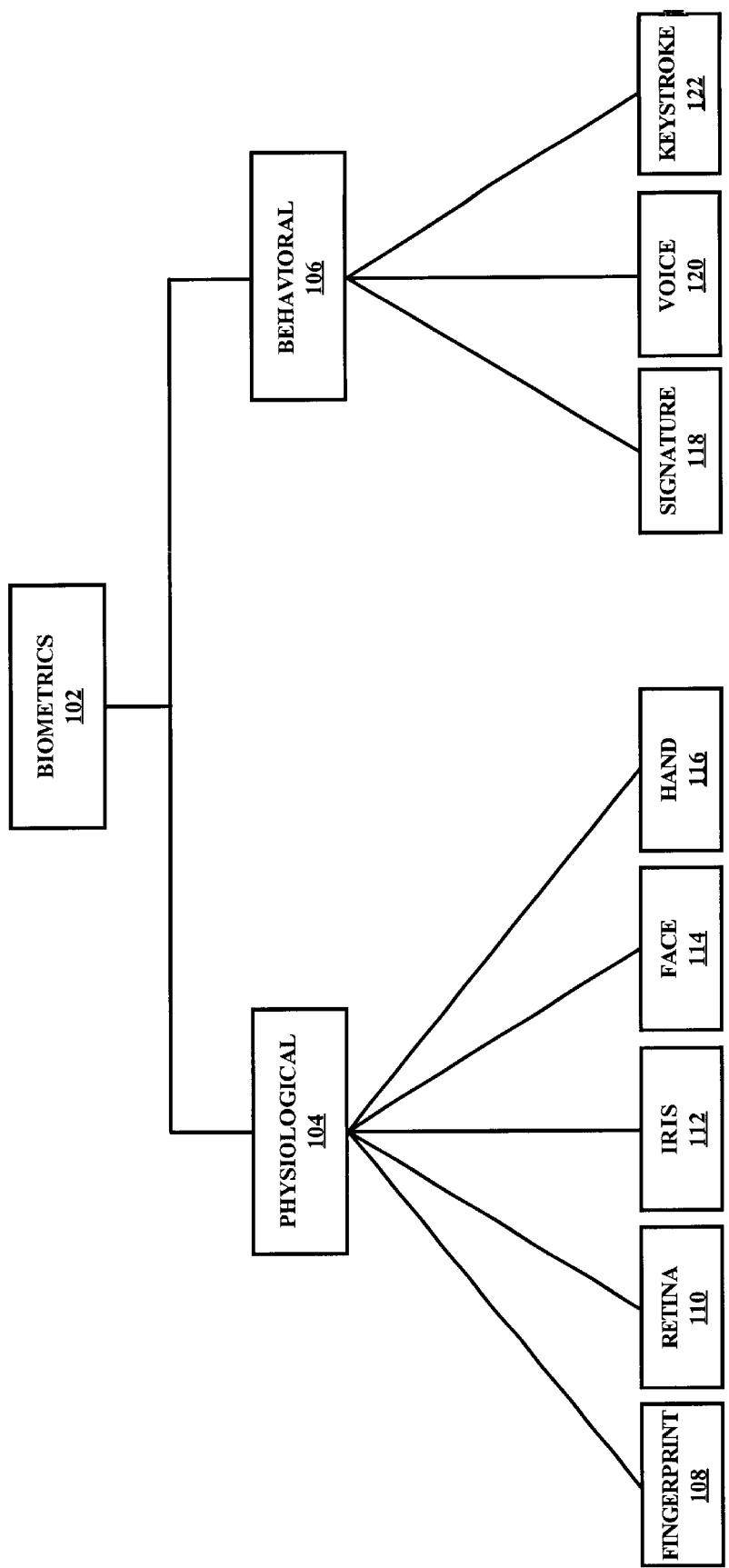
FIG. 1 illustrates various biometrics.
Figure 2:
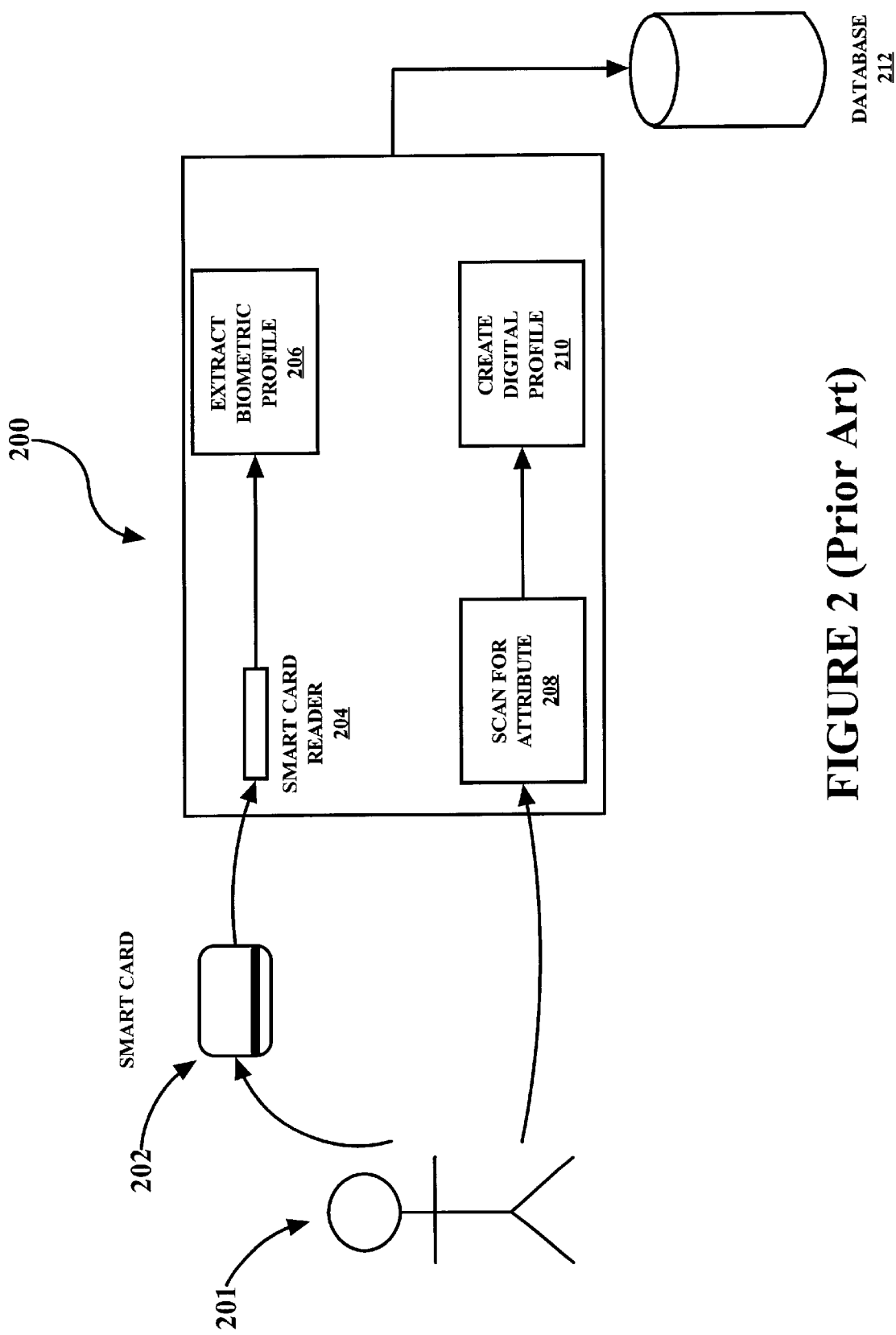
FIG. 2 illustrates prior art biometric based authentication systems.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications for its construction and is not intended to limit the invention to the embodiment illustrated. Those skilled in the art will envision many other possible variations within the scope of the present invention.

Figure 3:
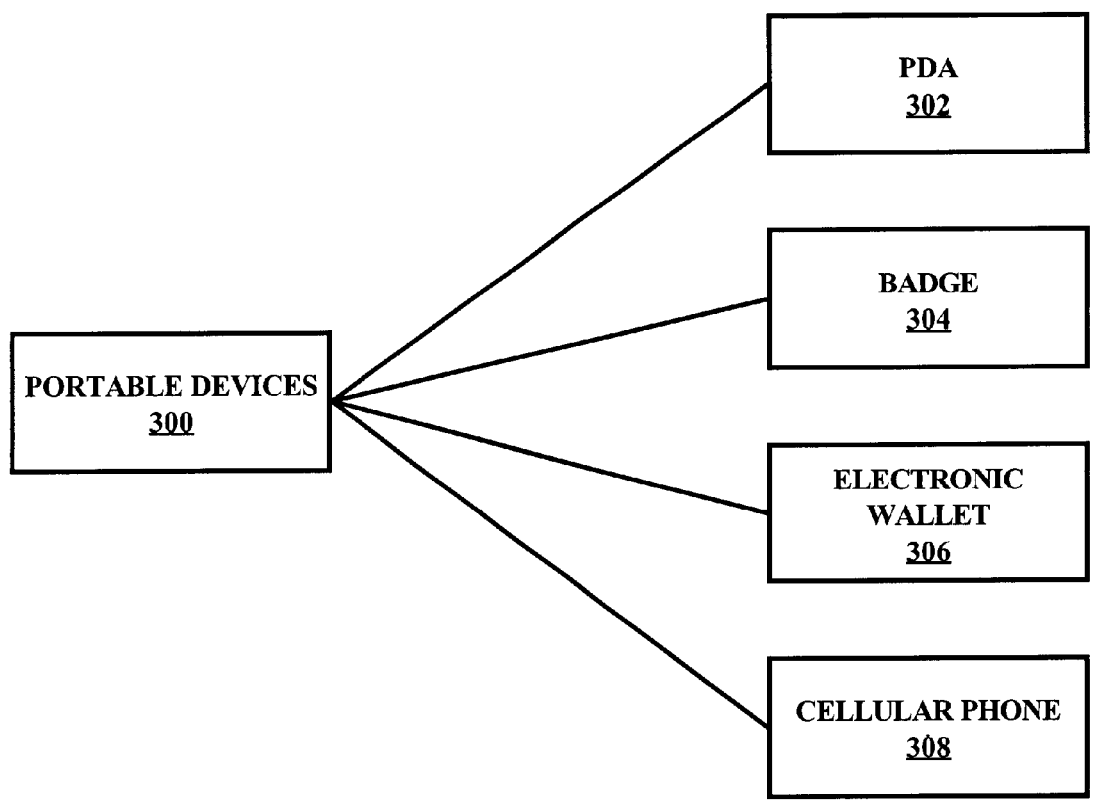
FIG. 3 illustrates various portable devices as applicable to the present invention.

The present invention provides for a method and a system for wireless, biometric-based authentication using portable devices. Stored within the portable device of the current invention is a copy of a biometric template associated with a user (who is the owner of said portable device.) The present invention encompasses a variety of portable devices. FIG. 3 illustrates examples of various portable devices 300 as applicable to the present invention.

Portable devices 300 include personal digital assistants or PDA's 302, badges 304, electronic wallets 306, and cellular phones 308. An interpretation of portable devices, however, should not be limited to the above said devices. One skilled in the art can easily recognize other devices that fall under this category and hence should not be used to limit the scope of this invention.

Figure 4:
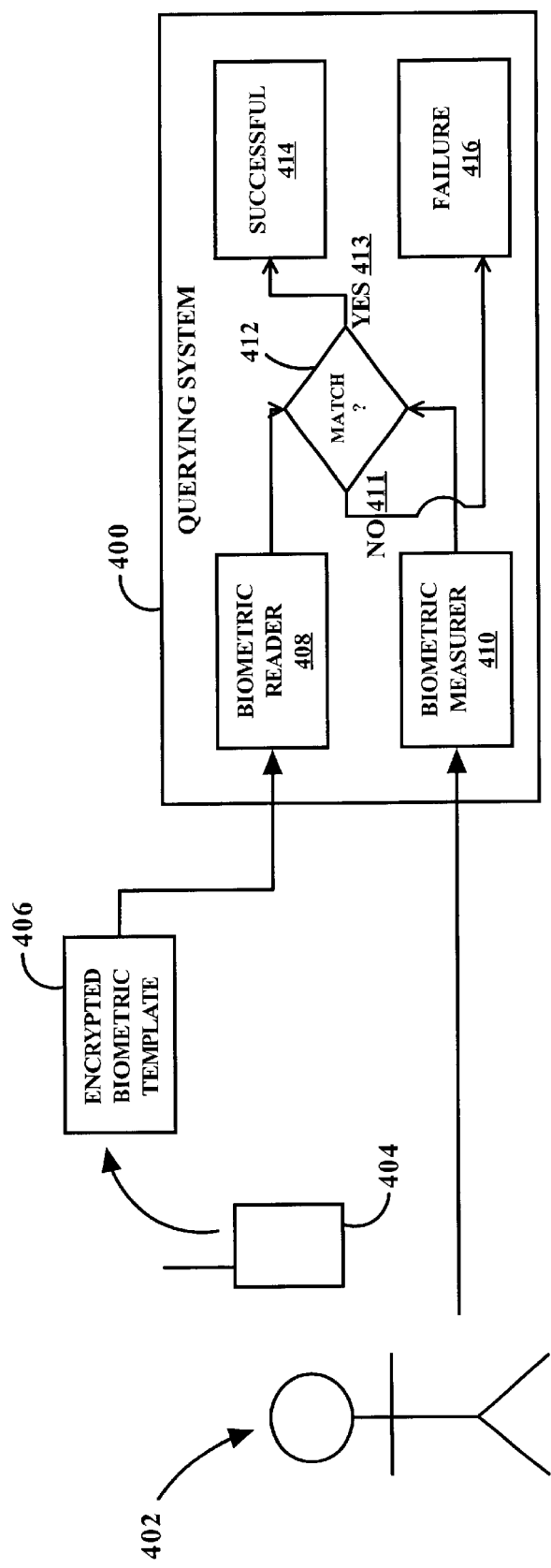
FIG. 4 illustrates a system representative of the preferred embodiment of the present invention wherein a portable device, equipped with a wireless simplex connection, is utilized in biometric authentication.

FIG. 4 illustrates the system representative of the preferred embodiment of the present invention wherein a portable device, equipped with a wireless simplex connection (one way) is utilized in biometric authentication. A simplex connection in this context refers to transmission in only one direction (an example of simplex communications is a simple radio, which you can receive data from stations, but can't transmit data.) Referring back to FIG. 4, portable device 404 of user 402 is queried by a querying system 400, generates a wireless transmittal of a biometric template 406 from the portable device 404 to biometric reader 408 in querying system 400. The wireless transmittal can be initiated periodically by a timer in the portable device 404, a button on the portable device 404 pressed by the user 402, a motion detector, vibration detector, light detector, ultrasonic detector or other sensor on or near the portable device 404, a wireless receiver on the portable device 404 that receives a query from the querying system 400, or other methods to detect internal or external stimuli. In a further embodiment, the transmitted message is encrypted. Next, biometric measurer 410 measures the corresponding biometric (which corresponds to the biometric transmitted by the portable device) associated with user 402. Then, check 412 is performed in the querying system as to whether or not acquired biometric matches (acquired via biometric measurer 410) transmitted template 406, and upon successful matching 413 authentication confirmation message 414 is produced.

Once the check 412 is preformed, the biometric template 406 which is temporarily stored in the biometric reader 408, is erased, eliminating any permanent record of the user's 402 biometric record in the querying system 400. The absence of a permanent record of the user's 402 biometric template 406 in the querying system 400, protects the privacy of the user 402, and increases the security of a system that uses the invention, since records of the biometric template 406 which may be used to assume the identity of a user 402 are not available. The only existence of the user's 402 biometric template 406 is in the portable device 404, which is in the users 402 possession. Since the portable device 404 it is not removed from the user 402 during biometric verification, as with a smart card, there is a much smaller chance of the inconvenience caused by card loss.

Alternatively, if there is a negative match 411, then authentication failure notice is produced 416. Furthermore, the present system is a time-limited one-way (simplex) system, since the system holds the template for a limited time, then deletes it. Hence, the user must provide a biometric to the biometric measurer 410 by that time to gain access.

For example, when the user 402 comes with the query system 400, the user 402 presses a button on the portable device 404, that causes the portable device 404 to generate a wireless transmission of the biometric template 406 to the querying system 400. The user 402 then places their finger on the biometric measurer 410. Assuming they are the proper owner of the portable device 404 (i.e. their fingerprint template is stored in the portable device 404), the querying system 400 would generate a confirmation message 414 to an application, for example a computer, giving the user 402 access to the computer. After sending the biometric template 406, the portable device 404 can periodically (e.g. every minute) transmit an "I am here" message to the querying system 400 which passes the message on to the computer. If the computer fails to receive the "I am here" message for three minutes, the computer assumes the user 402 has left the vicinity of the querying system 400, and revokes permission to use the computer, until a new biometric verification is successfully completed. In another embodiment, re-verification may be required each time the user 402 tries to access highly sensitive information. Further, re-verification may be required every 30 minutes, even though the user 402 has not left the proximity of the querying system 400. There are many variations of conditions that would require re-verification based in part on the level of security an entity wants to maintain, balanced against the convenience of the user.

In a preferred embodiment of the system shown in FIG. 4, the portable device 404 includes a battery powered radio frequency transmitter to allow wireless communication in range of excess of 1 meter. An alternative embodiment uses a radio frequency identification (RFID) chip inside the portable device that derive power from an electric or magnetic interrogating field from the querying system 400, and sends the biometric template 406 by loading the interrogating field. The interrogating field provides the stimulus to serve as the request for a biometric template.

Figure 5:
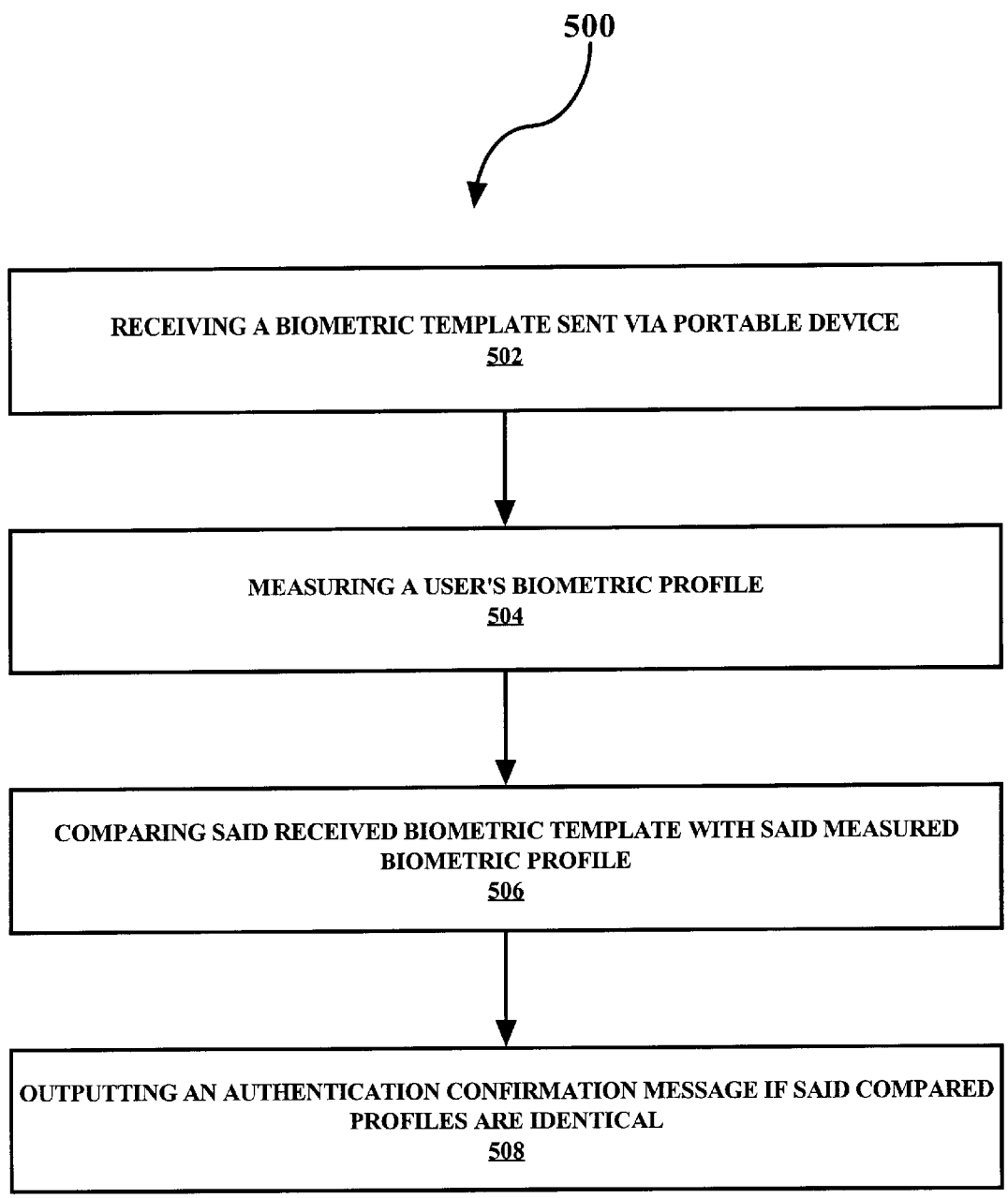
FIG. 5 illustrates the method for the system described in FIG. 4.

The method of the system described with respect to FIG. 4 is illustrated in FIG. 5. The method 500 begins by a querying system receiving a wirelessly transmitted biometric template 502 transmitted via a portable device. Next, a biometric profile (corresponding to the received biometric) is measured 504 by the querying system. Then, the querying system checks 506 to see if the acquired biometric matches the biometric transmitted by the portable device. Lastly, based on the result of matching step 506, an authentication successful or failure message is outputted 508.

Figure 6:
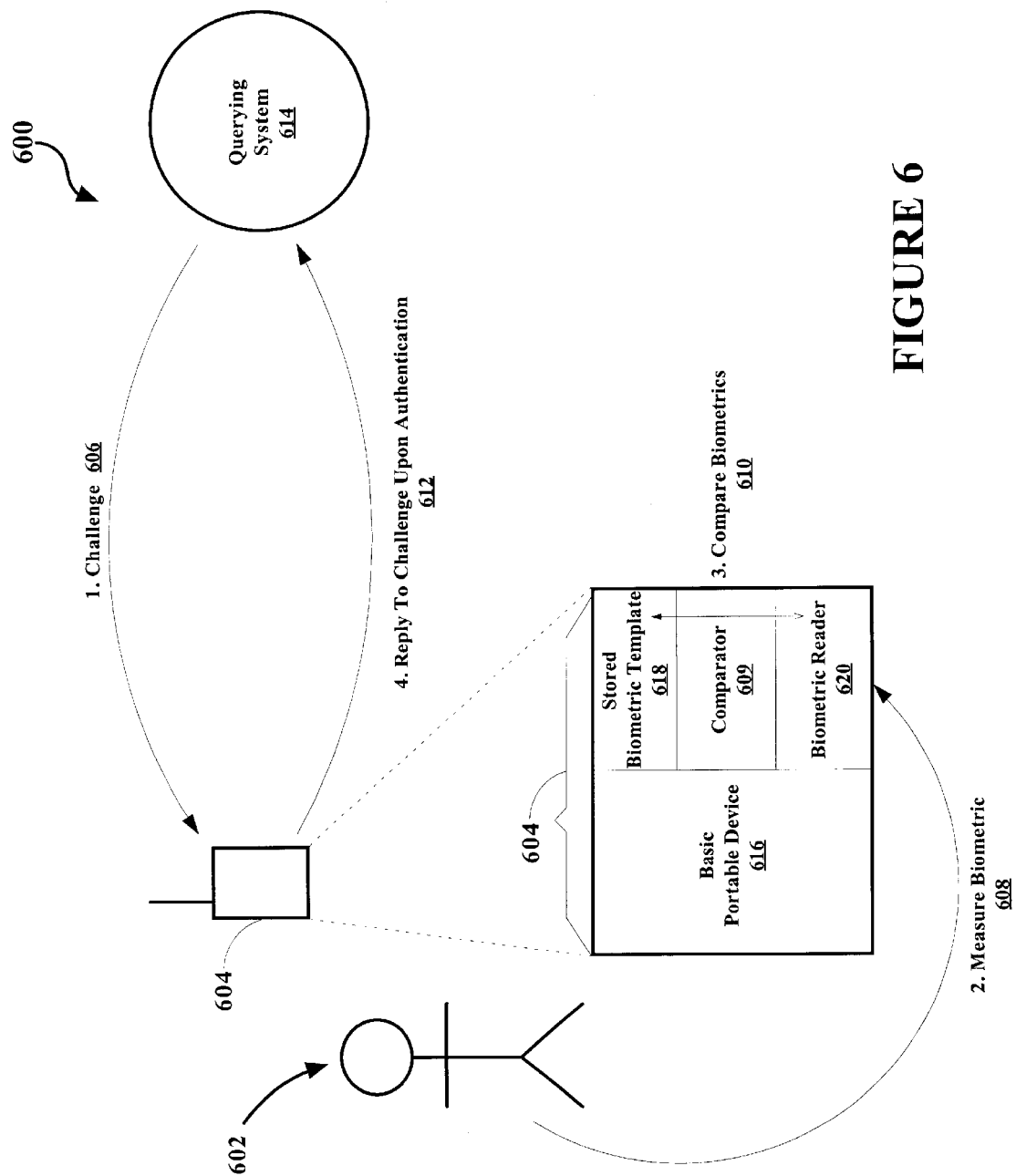
FIG. 6 illustrates a system representative of the second embodiment of the present invention.

FIG. 6 illustrates the system 600 associated with the second embodiment of the current invention, wherein the portable device 604 further includes portable device transmitter/receiver 616, stored biometric template 618, built-in biometric reader 620, biometric-comparator 609. The portable device described in this embodiment forms part of a duplex connection. Duplex or full duplex communications refers to the transmission of data in two directions simultaneously (e.g., a telephone is a full-duplex device because both parties can talk at once.) First, querying system 614 presents challenge 606 to portable device 604. Then, in response to challenge 606, biometric reader 620 (located within portable device 604) measures biometric 608 associated with user 602. Next, biometric-comparator 609 compares 610 acquired biometric 608 with that of stored biometric template 618 to see if they match. Upon successful authentication, reply 612 is sent to querying system 614 presenting challenge 612.

Figure 7:
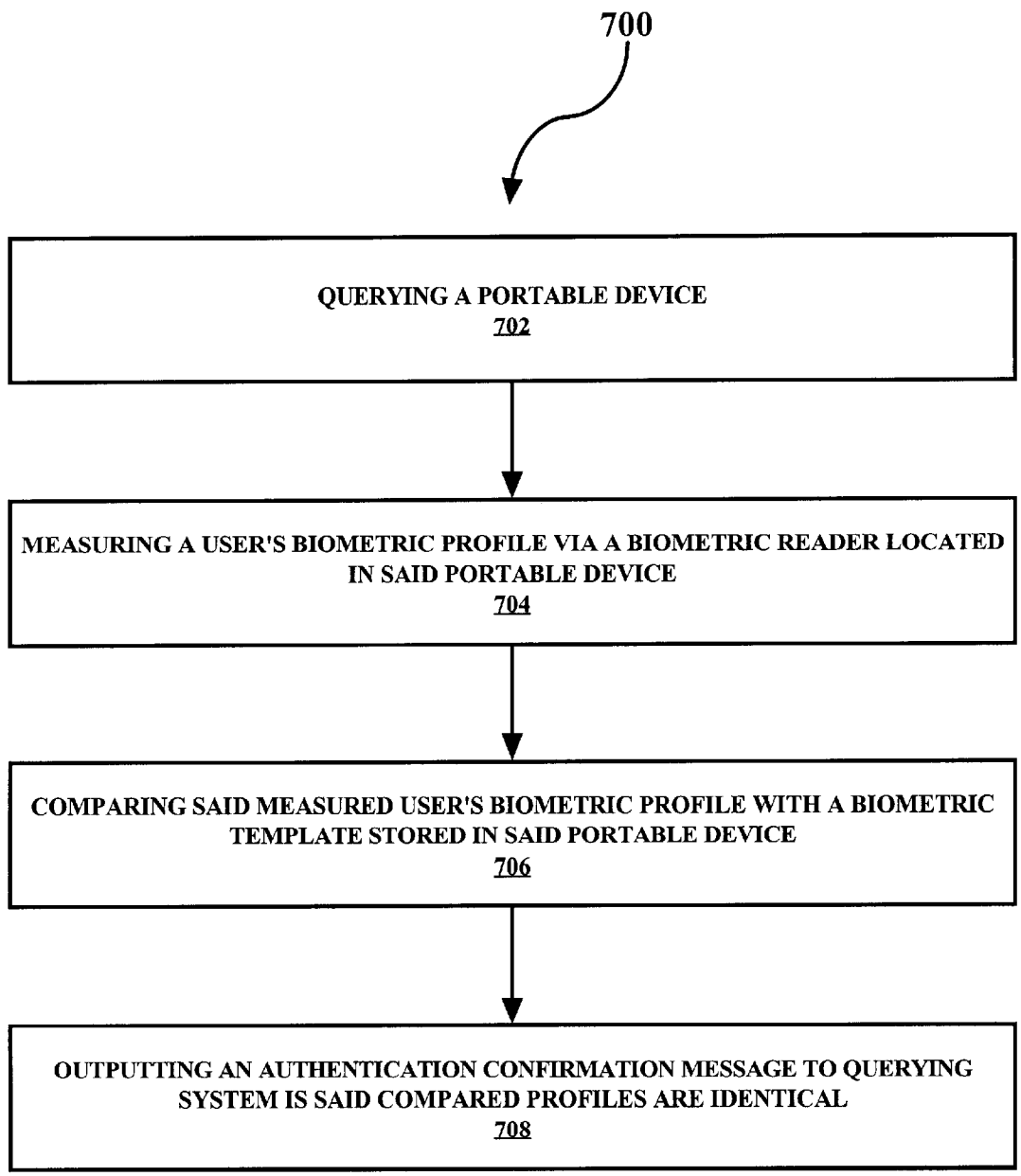
FIG. 7 illustrates the method for the system described in FIG. 6.

The method of the system described with respect to FIG. 6 is illustrated in FIG. 7. The method 700 begins by querying 702 a portable device with a challenge. Next, a biometric profile of the user is measured 704 by a biometric reader located within the portable device. As a next step, a comparison 706 is made to determine if the acquired biometric matches the biometric template stored locally in the portable device. Lastly, if a match is established in step 706, a reply is output 708 to the querying system that presented the challenge.

Figure 8:
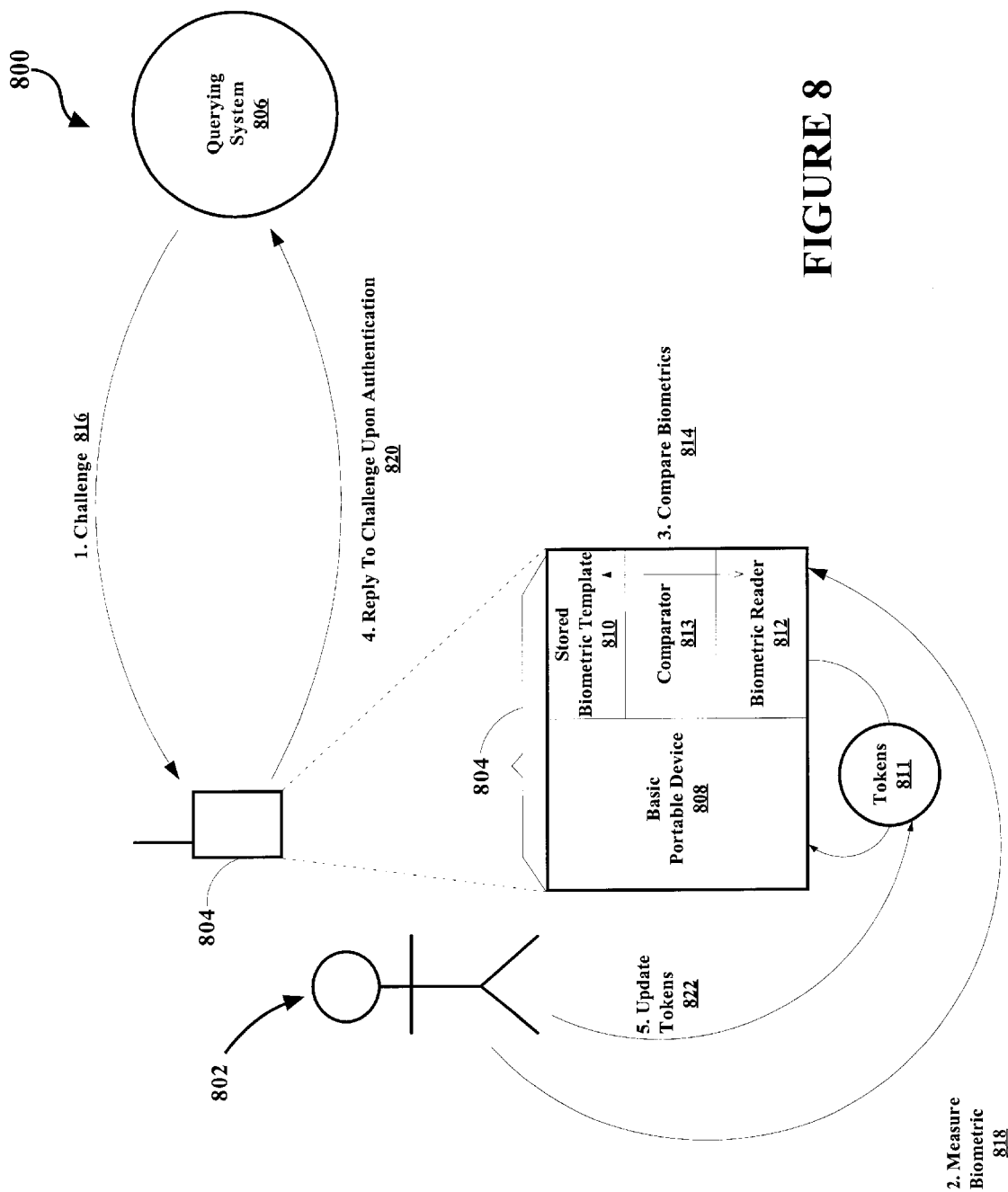
FIG. 8 illustrates a system representative of the third embodiment of the present invention.

FIG. 8 illustrates system 800 representative of another embodiment of the present invention wherein portable device is equipped with means of authentication persistence based on a threshold or criteria test. Portable device 804 further includes portable device transmitter/receiver 808, stored biometric template 810, built-in biometric reader 812, biometric-comparator 813. The portable device described in this embodiment forms part of a duplex connection. First, querying system 806 presents challenge 816 to portable device 804. Then, in response to challenge 816, biometric reader 812 (located within portal device 804) measures biometric 818 associated with user 802. Next, biometric-comparator 813 compares 814 acquired biometric 818 with that of stored biometric template 810 to see if they match. In the event of a match, reply 820 is sent to the querying system and additionally, once a user is reliably authenticated using biometrics (e.g., fingerprints), a token-authenticator issues an authentication token 811 on a temporary basis to the user's portable device 804; which will maintain the authentication status of user 802 for a short period of time for which the user is authorized to perform a range of privileged activities and/or renew authentication status using various criterions or thresholds 822. For example, after a user makes a connection (via the portable device) to a bank, the present system performs a biometric authentication to ensure that the right person is using the portable device. Next, over a period of time, the user is allowed to perform various privileged activities (e.g., check account balance or make an electronic funds transfer) based on different thresholds (e.g., based on the user's keystroke pattern.) In addition, a low privileged activity requires a low threshold or criteria to renew authentication status. In contrast, a high privileged activity requires a high threshold or criteria to be met before renewing authentication status. On the other hand, when portable device 804 detects an unusual pattern (e.g., a kestroke pattern that does not match the user's profile stored in the portable device), authentication token 811 is forced to expire.

Figure 9:
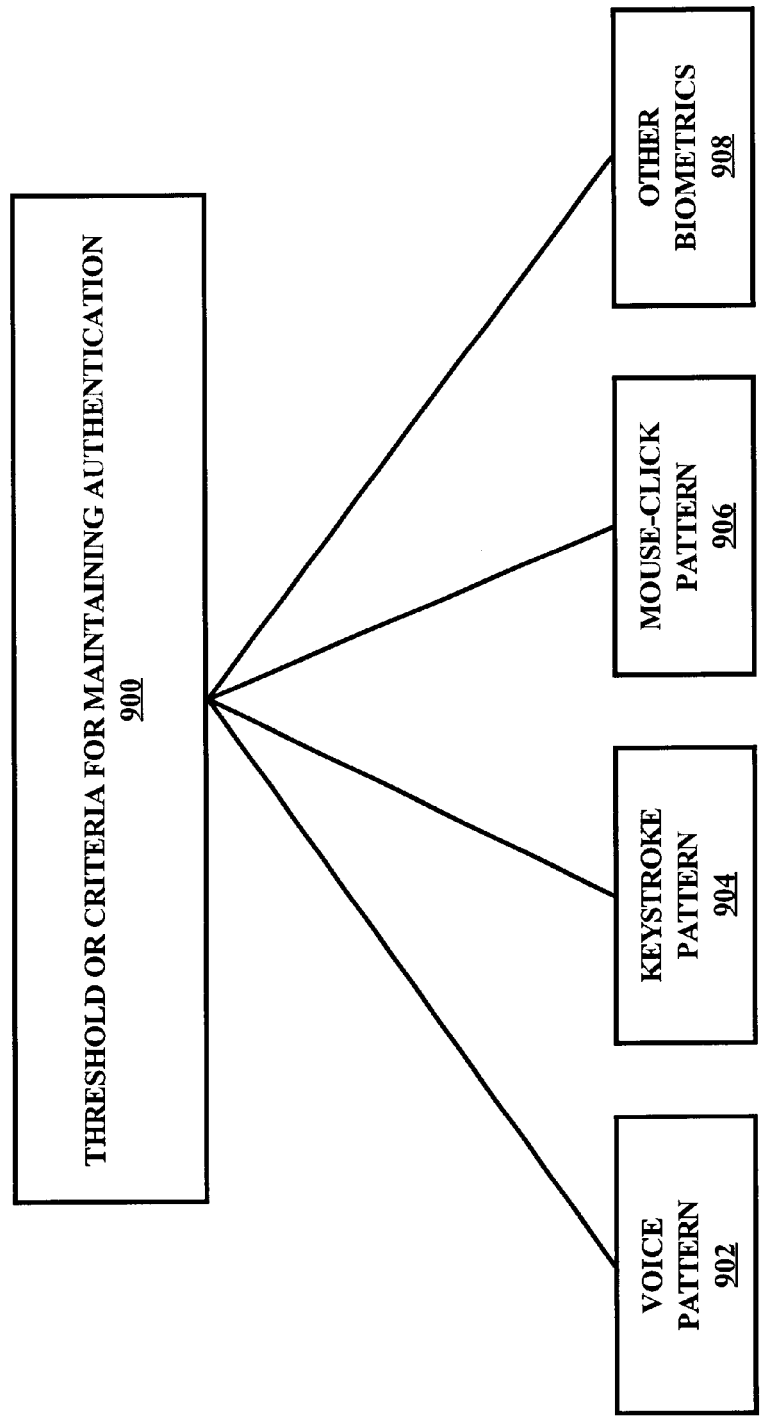
FIG. 9 illustrates various threshold or criteria used for maintaining authentication of token.

FIG. 9 illustrates some of the threshold or criteria 900 that can be used in conjunction with the present invention. Some threshold or criterion regarding renewal or authentication of tokens include, but should not be limited to: voice patterns 902, keystroke patterns 904, mouse-click patterns 906, or any of the other biometrics described earlier 906. Hence, authentication of tokens is performed if any of the above mentioned patterns matches that of the stored patterns (of the same user) in the portable device. An interpretation of thresholds or criterion, however, should not be limited to the above described patterns. One skilled in the art can easily recognize others patterns that fall under this category and hence should not be used to limit the scope of this invention.

Figure 10:
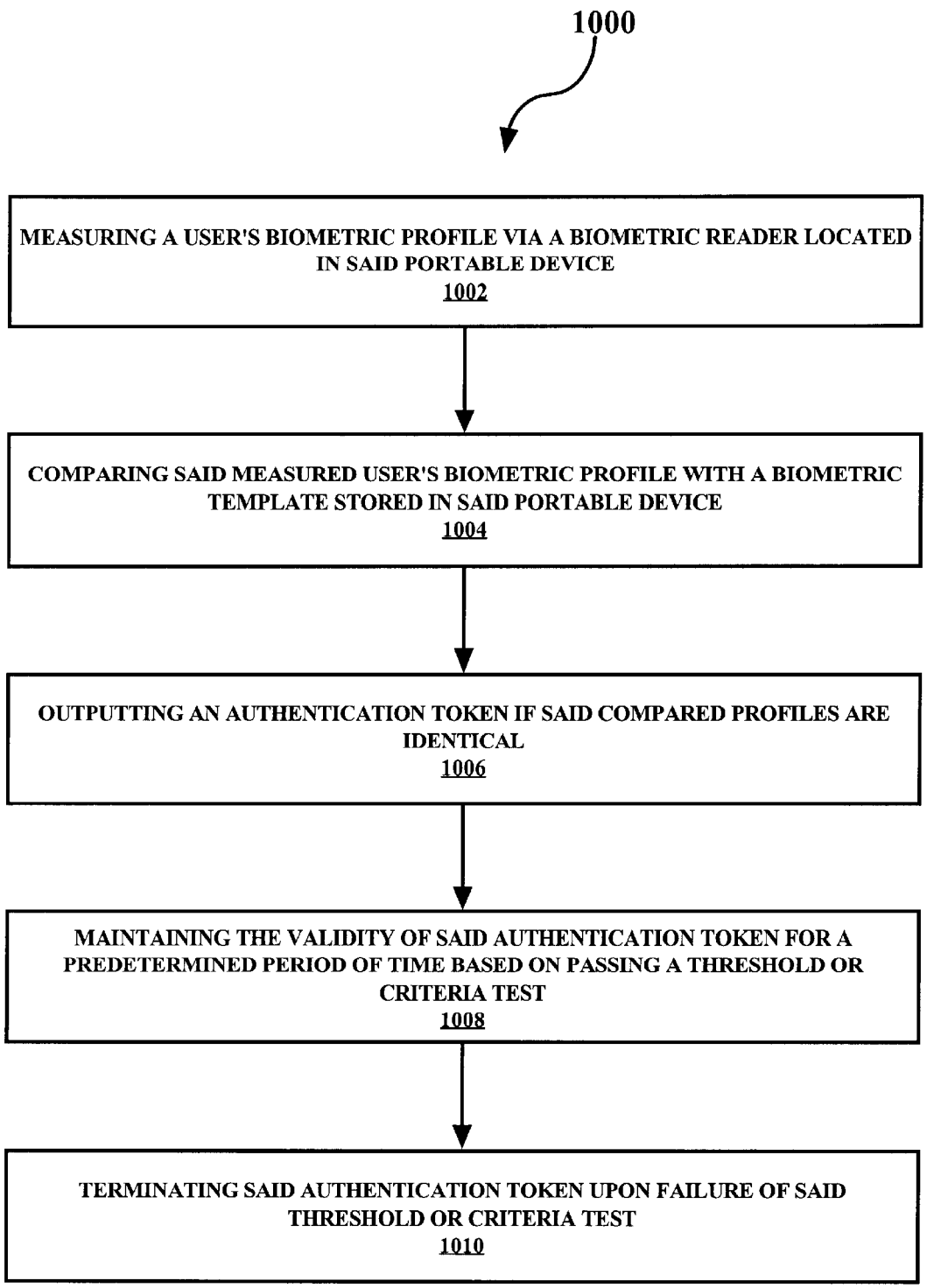
FIG. 10 illustrates the method for the system described in FIG. 8.

FIG. 10 illustrates the method 1000 associated with the system described in FIG. 8. First, a user's biometric is measured 1002 using a biometric reader located in the portable device. Next, a comparison 1004 is made between the acquired biometric and the biometric stored locally in the portable device. Upon successful matching an temporary authentication token is outputted 1006 by the portable device. Next, the status of the authentication token is maintained and updated 1008 based on passing a threshold or criteria test. Finally, the temporary authentication is terminated if the portable device detects any unusual pattern or upon failure of threshold test 1010.

In a further embodiment, the tokens are used for continuous monitoring activities of the user to elevate or depress the security levels. For example, users with portable devices similar to the one described above, can be continuously monitored to see if they have left a secure area. In the event a user is in a secure area, the threshold for the renewal of authentication tokens is made high. In contrast, if a user has left the secure area, the threshold for the renewal of authentication is based on a less stringent criteria.

Figure 11:
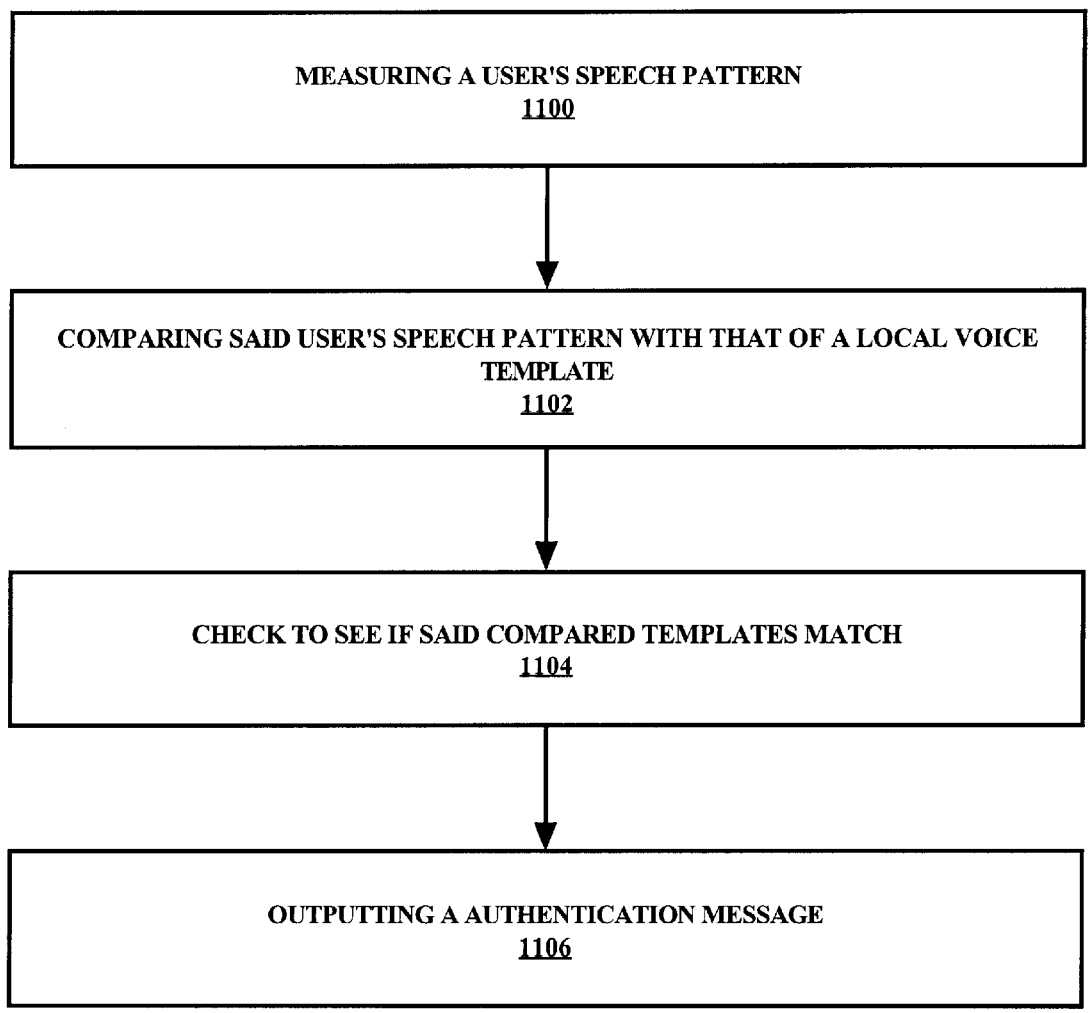
FIG. 11 illustrates voice-based authentication of cellular phones based on the present invention.

In one embodiment, as illustrated in FIG. 11, the portable device is a cell phone which contains a local voice print template. When the user speaks into the cell phone, the voice is measured 1100 and compared 1102 with the local template. Next, a check 1104 is performed to see if the measured speech pattern matches a locally stored voice template. If a match is determined, the cell phone sends an "authentication verification" message 1106 to the system allowing an action to take place (e.g., a call to be placed to access banking information or stock trades are completed.)

Thus, existing schemes of authentication can be strengthened by the present invention's method and a system to wirelessly authenticate a user using a combination of biometrics (e.g. fingerprint) and a locally stored biometric template. The chances of an intruder accessing biometric data is greatly reduced by storing the biometric template locally. A portable device like the badge with wireless simplex connection (one way) is faster than inserting a smart card into a reader. On the other hand, a portable reader like a badge with reader and duplex connection (two way) is more secure since a fingerprint template is never transmitted.

The above system and its described functional elements are implemented in various wireless environments. For example, the present invention may be implemented on a conventional portable telephone, badge, electronic wallet, wireless smartcard, personal digital assistant or equivalents. The programming of the present invention may be implemented by one of skill in the art of biometric-based authentication.

CONCLUSION

A system and method has been shown in the above embodiments for the effective implementation of a system and method for biometric-based authentication in wireless communication for access control. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware. In addition, the specific chosen biometrics and threshold (or criteria) are representative of the preferred embodiment and should not limit the scope of the invention.

What is claimed is:

1. A method for biometric authentication based on communication between a portable electronic device and a security authenticator, said method comprising:

presenting a challenge to said portable electronic device, wherein said portable electronic device, after reception of said challenge: identifies a biometric template, measures a user's biometric profile via a biometric measurer located within said portable electronic device, and identifies an authentication output via comparing said identified biometric template with said measured biometric profile;

receiving said authentication output, said authentication output comprising an authentication token and an authentication message, said authentication message being an authentication successful message if said compared biometrics are identical, else, said authentication message being an authentication failure message if said compared biometrics do not match, and wherein the validity of said authentication token is maintained in said portable electronic device for a predetermined period of time based on a threshold or criteria test, with said authentication token being terminated upon failure of threshold or criteria test.

2. A method for biometric authentication based on communication between a portable electronic device and a security authenticator, as per claim 1, wherein said presented challenge is in response to a stimulus, said stimulus comprising any of: a timer, a button, a motion detector, or an external query.

3. A method for biometric authentication based on communication between a portable electronic device and a security authenticator, as per claim 1, wherein said portable electronic device comprises one of the following: personal digital assistant (PDA), badge, electronic wallet, wireless smartcard, or portable telephone.

4. A method for biometric authentication based on communication between a portable electronic device and a security authenticator, as per claim 1, wherein said user's biometric profile is a physiological profile.

5. A method for biometric authentication based on communication between a portable electronic device and a security authenticator, as per claim 4, wherein said measured physiological biometric comprises any of the following: fingerprint pattern, retinal pattern, pattern of iris, facial pattern, or hand pattern.

6. A method for biometric authentication based on communication between a portable electronic device and a security authenticator, as per claim 1, wherein said user's biometric profile is a behavioral profile.

7. A method for biometric authentication based on communication between a portable electronic device and a security authenticator, as per claim 6, wherein said measured behavioral biometric comprises of one of the following: signature pattern, voice pattern, or key stroke pattern.

8. A system for biometric authentication based on communication between a portable electronic device and a security authenticator, said portable electronic device comprising any of: simplex, duplex, or tokenized modes of communications, said system comprising:
    a stimulus which requests a biometric template from said portable device;
    a biometric-reader which wirelessly receives said requested biometric template from said portable device;
    a biometric measurer which measures a user's biometric profile via a biometric reader, wherein
        said biometric reader located within said security authenticator if said biometric authentication is based on said simplex connections, else
        said biometric reader located within said portable device if said biometric authentication is based on duplex or tokenized connection;
    a biometric comparator which compares said wirelessly received biometric template with said measured biometric profile,
    an output-generator which generates an output based on said compared biometrics, wherein said output is
        an authentication token if said compared biometrics are identical and said biometric authentication is based on said duplex connection, else
        an authentication successful message if said compared biometrics are identical, and said biometric authentication is based on said simplex connection, else
        an authentication failure message if said compared biometrics do not match;
    an authentication validator which maintains the validity of said authentication token for a predetermined period of time based on a threshold or criteria test; and
    a token terminator which terminates said authentication token upon failure of threshold or criteria test.

9. A system for biometric authentication based on communication between a portable electronic device and a security authenticator, as per claim 8, wherein said stimulus is provided by said biometric reader.

10. A system for biometric authentication based on communication between a portable electronic device and a security authenticator, as per claim 8, wherein said received biometric template is encrypted.

11. A system for biometric authentication based on communication between a portable electronic device and a security authenticator, as per claim 8, wherein said biometric reader further comprises a decrypter for decrypting said received encrypted biometric template.

12. A system for biometric authentication based on communication between a portable electronic device and a security authenticator, as per claim 8, wherein said portable device comprises one of the following: personal digital assistant (PDA), badge, electronic wallet, wireless smartcard, or portable telephone.

13. A system for biometric authentication based on communication between a portable electronic device and a security authenticator, as per claim 8, wherein said biometric measurer measures a user's physiological biometric profile.

14. A system for biometric authentication based on communication between a portable electronic device and a security authenticator, as per claim 13, wherein said measured user's physiological biometric profile comprises any of the following: fingerprint pattern, retinal pattern, pattern of iris, facial pattern, or hand pattern.

15. A system for biometric authentication based on communication between a portable electronic device and a security authenticator, as per claim 8, wherein said biometric measurer measures a user's behavioral biometric profile.

16. A system for biometric authentication based on communication between a portable electronic device and a security authenticator, as per claim 5, wherein said measured user's behavioral biometric comprises of one of the following: signature pattern, voice pattern, or key stroke pattern.

17. A method for biometric authentication based on duplex communication between a portable electronic device and a system, said method as implemented in said portable electronic device comprising:
    receiving a challenge from said system;
    retrieving a biometric template from said portable device;
    measuring a user's biometric profile via a biometric measurer located within said portable device;
    comparing said retrieved biometric template with said measured biometric profile, and
    generating an output based on said compared biometrics, wherein said output is
        an authentication token and an authentication successful message if said compared biometrics are identical, said authentication successful message forwarded to said system issuing said challenge and said token stored locally in said portable electronic device, else
        an authentication failure message if said compared biometrics do not match.

18. A method for biometric authentication based on duplex communication between a portable electronic device and a system, as per claim 17, wherein said step of generating an authentication token further comprises:
    maintaining the validity of said authentication token for a predetermined period of time based on a threshold or criteria test, and
    terminating said authentication token upon failure of threshold or criteria test.

19. A method for biometric authentication based on duplex communication between a portable electronic device and a system, as per claim 17, wherein said portable electronic device comprises one of the following: personal digital assistant (PDA), badge, electronic wallet, wireless smartcard, or portable telephone.

20. A method for biometric authentication based on duplex communication between a portable electronic device and a system, as per claim 17, wherein said user's biometric profile is a physiological profile.

21. A method for biometric authentication based on duplex communication between a portable electronic device and a system, as per claim 20, wherein said measured physiological biometric comprises any of the following:

fingerprint pattern, retinal pattern, pattern of iris, facial pattern, or hand pattern.

22. A method for biometric authentication based on duplex communication between a portable electronic device and a system, as per claim 17, wherein said user's biometric profile is a behavioral profile.

23. A method for biometric authentication based on duplex communication between a portable electronic device and a system, as per claim 22, wherein said measured behavioral biometric comprises of one of the following: signature pattern, voice pattern, or key stroke pattern.

24. A portable electronic device performing biometric authentication based on duplex communication with a system, said portable electronic device comprising:

a biometric measurer which measures a user's biometric profile via a biometric reader located within said portable device;

a biometric comparator which compares said measured biometric profile with a biometric template which is stored within said portable device;

an output-generator which generates an output based on said compared biometrics, wherein said output is an authentication token and authentication successful message if said compared biometrics are identical said authentication successful message forwarded to said system and said token stored locally in said portable electronic device, else an authentication failure message if said compared biometrics do not match;

an authentication validator which maintains the validity of said authentication token for a predetermined period of time based on a threshold or criteria test, and a token terminator which terminates said authentication token upon failure of threshold or criteria test.

25. A portable electronic device performing biometric authentication based on duplex communication with a system, as per claim 24, wherein said portable electronic device comprises one of the following: personal digital assistant (PDA), badge, electronic wallet, wireless smartcard, or portable telephone.

26. A portable electronic device performing biometric authentication based on duplex communication with a system, as per claim 24, wherein said biometric measurer measures a user's physiological biometric profile.

27. A portable electronic device performing biometric authentication based on duplex communication with a system, as per claim 26, wherein said measured user's physiological biometric profile comprises any of the following: fingerprint pattern, retinal pattern, pattern of iris, facial pattern, or hand pattern.

28. A portable electronic device performing biometric authentication based on duplex communication with a system, as per claim 24, wherein said biometric measurer measures a user's behavioral biometric profile.

29. A portable electronic device performing biometric authentication based on duplex communication with a system, as per claim 28, wherein said measured user's behavioral biometric comprises of one of the following: signature pattern, voice pattern, or key stroke pattern.

\* \* \* \* \*